July 5, 1949. D. R. WOOD 2,475,069
WARNING DEVICE FOR REFRIGERATORS
Filed Nov. 9, 1945

Inventor
Delos R. Wood
By John E. Hughes Jr.
Attorney

Patented July 5, 1949

2,475,069

UNITED STATES PATENT OFFICE 2,475,069

WARNING DEVICE FOR REFRIGERATORS

Delos R. Wood, St. Paul, Minn.

Application November 9, 1945, Serial No. 627,649

1 Claim. (Cl. 177—311)

This invention relates to a device for automatically giving a warning signal when a refrigerant system develops a defect which would cause an abnormal temperature condition in the cooling chamber.

Heretofore serious loss and damage to the contents of refrigerators has often resulted from failure to discover and repair defects in the refrigerant system promptly. By the present device I automatically give a timely warning so that the defective condition may be corrected before serious damage has been caused.

It is an object of my invention to provide a simple and reliable warning device of this class.

A further and particular object is to provide a device of this class which is responsive to both abnormally high and low pressures in the low pressure side of the refrigerant system to give an automatic warning either in the form of an audible or visible signal or both audible and visible signals.

Other objects will appear and be more fully pointed out in the following specification and claims.

The invention will be best understood by reference to the accompanying drawing in which.

Figure 1:
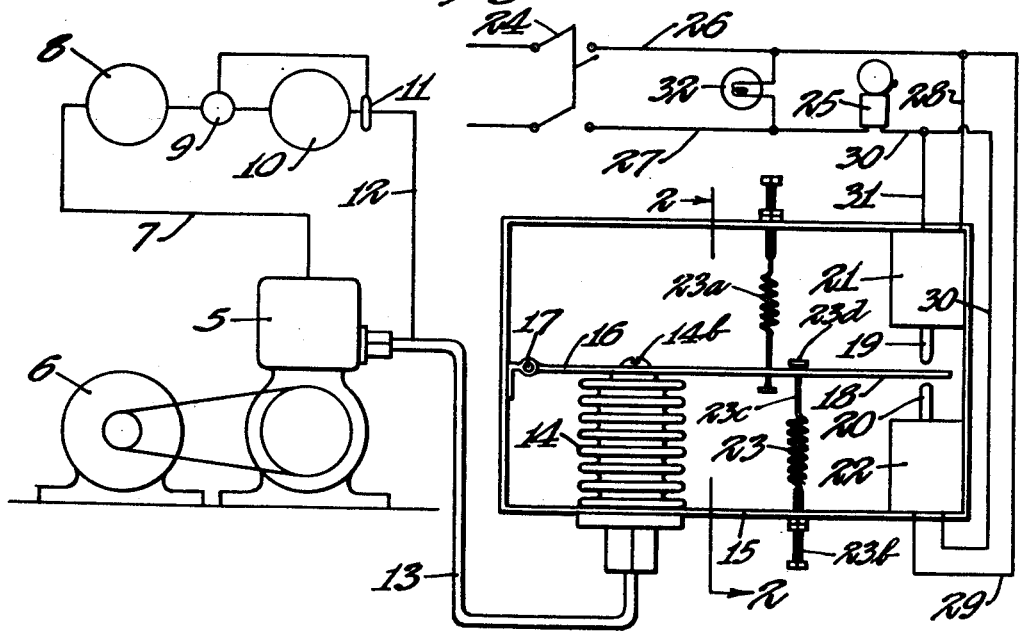
Figure 1 is a side elevational view showing a preferred arrangement of the principal control elements of my warning device and with the electric warning circuit and refrigerant system shown diagrammatically.

Referring to the drawing, the compressor of a refrigerator of common type is indicated by the numeral 5 and an electric motor operatively connected to the compressor is indicated at 6. The refrigerant system includes a high pressure line 7 extending from the compressor to a condenser 8 from which the refrigerant passes through an expansion valve 9 to an evaporator 10. As shown, the valve 9 has a thermostatic control having a bulb 11 subject to the temperature in the low pressure line 12 which returns the refrigerant to the compressor. Controls for the electric motor 6 of any common or suitable type may be employed.

In the preferred form of my device a tube 13 extends from the low pressure side of the refrigerant system to a bellows 14 mounted in a suitable housing 15. The bellows are subject to the low side pressure so that they expand and contract with variations therein. Supported at one end on the housing 15 of the bellows 14 are arranged to actuate an arm 16 having a pivot support 17 mounted on the housing 15. The arm 16 is connected to the upper end of the bellows 14 by a screw 14b and has a free end portion 18 which oscillates between a pair of switch actuating pins 19 and 20. The shank of the screw 14b fits loosely in a perforation in the arm 16 to permit straight line axial expansion and contraction of the bellows. The pin 19 is arranged to close a switch 21 when moved upward and the pin 20 is arranged to close a switch 22 when moved downward. Both of these switches are spring biased to normally open positions.

To adapt my device for use with refrigerant systems in which the pressures vary between wide limits, I provide springs 23 and 23a so connected to the arm 16 as to permit a desirable range of lost motion and to oppose expansion and contraction of the bellows 14 at upper and lower limits which are adjustable. For this purpose the spring 23 has a set screw 23b adjustably connecting its lower end to the casing 15 and an upper end portion 23c fitting loosely in a perforation in the arm 16 and provided with a head 23d adapted to engage the upper surface of the arm at an elevation determined by the adjustment of the screw 23b. The spring 23a is similarly connected to the top of the casing 15 and to the arm 16 to adjustably limit downward movement of said arm.

An audible warning signal, indicated by the numeral 25, is arranged in circuit with and under control of the switches 21 and 22 so that the signal is operated when either of these switches is closed. As shown in Fig. 1, the circuit includes a manually operable switch 24 and power supply wires 26 and 27. The wire 26 is connected by branch wires 28 and 29 to terminals of the respective switches 21 and 22 and a wire 30 completes the circuit from the switch 22 to the signal 25 and a branch wire 31 connects the signal to the switch 21. The supply wire 27 extends to the signal 25. A visual signal 32 is preferably connected across the supply wires 26 and 27 to indicate when the warning system is in normal operation. A small green lamp may be used as the visual signal 32.

When the refrigerant system is in normal operation variations in the fluid pressure in the bellows 14 cause them to expand and contract to such a limited extent that the arm 16 is moved through an arc insufficient to actuate either of the switch pins 19 or 20 to close the switches.

For example, where the refrigerant system normally operates with pressures in the line 12 ranging from zero to ten pounds per square inch, such variations do not cause the bellows 14 to close either switch 21 or 22. However, should the pressure in line 12 increase to a value above the normal range, the bellows 14 would expand sufficiently to operates the pin 19 and close the switch 21. When this switch is closed the circuit from the current supply wires 26 and 27 is closed through the audible signal 25, wires 30 and 31, switch 21 and wire 28, thus giving a warning of abnormal condition. Abnormally high pressures in the low side line of the refrigerant system may be caused by either of a number of defects, such as failure of power supply, a broken or disconnected compressor drive belt, or if the expansion valve is held open by moisture or by other obstruction.

The circuit through the signal 25 is also closed when the pressure in the low side of the refrigerant system is reduced to a value below the normal range. In this case the bellows 14 are contracted by the reduced internal pressure sufficiently to close the switch 22 and thereby close the circuit operating the audible signal 25. Abnormally low pressures may be caused either by a wholly or partially clogged line or screen or by loss of refrigerant. In the event of the development of either of these abnormal conditions my device operates to give a timely warning.

Figure 3:
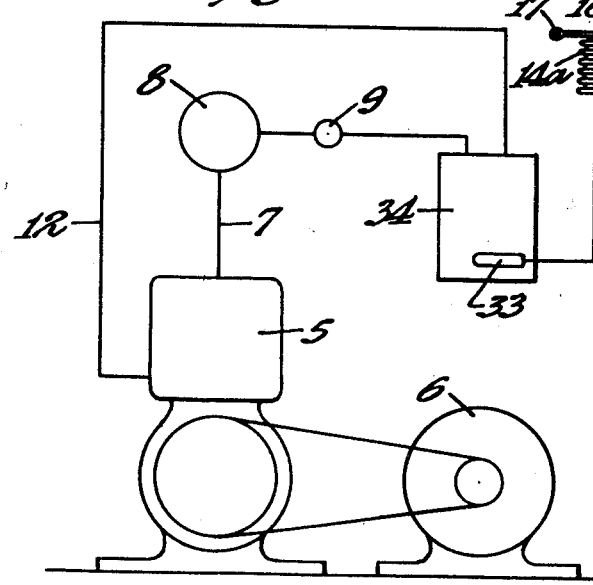
Fig. 3 is a diagrammatic illustration of an alternate form of my device.
Figure 2:
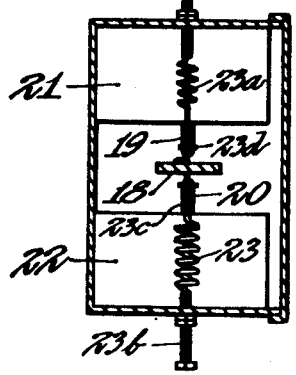
Fig. 2 is a section taken on the line 2—2 of Fig. 1.

In the alternate form of my device shown in Fig. 3 bellows 14a are arranged like the bellows 14 to control a warning signal circuit such as that hereinbefore described. The bellows 14a are connected by a tube 13a to a bulb 33 positioned in the cooling chamber 34 of the refrigerant system. This system, as described, may include a compressor 5 operated by a motor 6 to deliver high pressure refrigerant through a line 7 to the condenser 8 and thence through an expansion valve 9 to an evaporator in the chamber 34, the low pressure, return line being indicated by the numeral 12. The bulb 33, tube 13a and bellows 14a contain a suitable fluid fill which causes the bellows 14 to expand and contract between certain limits subject to the temperature in the chamber 34. The bellows 14a, like the bellows 14, are arranged to actuate the arm 16 for operating the switches 21 and 22 for controlling a warning signal circuit like that shown in Fig. 1. This temperature responsive warning device is particularly adapted for installation where the refrigerant system is of the sealed type and not originally provided with the warning device. The form of the invention shown in Fig. 1 is preferred for installations where the low pressure line or compressor of the system is accessible for making the connection with the tube 13. The switch 24 may be used to render the warning device inoperative during defrosting or when making repairs or adjustments.

It will be understood that the warning signal 25 and/or lamp 32 may be located either near the refrigerator or at a remote point where the signal will be most effective in calling immediate attention to any defect that may develop in the refrigerant system.

Having described my invention, what I claim as new and desire to protect by Letters Patent is:

A warning device for a refrigerant system which includes a compressor, a condenser and an evaporator, comprising a fluid pressure responsive means consisting of a bellows, pressure tubing connecting said bellows to the low pressure part of said refrigerant system between said evaporator and said compressor whereby said bellows is operative in response to variations in the pressure in the low pressure side of the system, an electric circuit including a warning signal and a pair of switches connected in parallel therewith, said switches being located on opposite sides of an arm member attached to the free end of said bellows, the other end of said bellows being fixedly supported by a frame which also carries said switches, each of said pair of switches including an actuating member which closes said switch to energize said warning signal when contacted and moved by said arm member, a pair of spring members, each connected to said arm member and to said frame, tension adjusting means associated with each of said spring means operative to vary selectively the upper and lower limits of pressure in the low pressure side of said refrigerant system beyond which limits the said switches are closed by said arm member to energize said warning device.

DELOS R. WOOD.

REFERENCES CITED

The following references are of record in the file of this patent:

UNITED STATES PATENTS

| Number | Name | Date |
| --- | --- | --- |
| 872,039 | Adams | Nov. 26, 1907 |
| 1,007,178 | Billings | Oct. 31, 1911 |
| 1,172,199 | Dana et al. | Feb. 15, 1916 |
| 1,422,853 | Hansen | July 18, 1922 |
| 2,092,085 | Riley | Sept. 7, 1937 |